(12) United States Patent
Minamizawa

(10) Patent No.: US 6,195,172 B1
(45) Date of Patent: *Feb. 27, 2001

(54) MULTI-FUNCTION PERIPHERAL DEVICE

(75) Inventor: Fumihiro Minamizawa, Toyoake (JP)

(73) Assignee: Brother Kogyo Kabushiki Kaisha, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,142

(22) Filed: Aug. 25, 1997

(30) Foreign Application Priority Data

Aug. 26, 1996 (JP) .................................... 8-223383

(51) Int. Cl.[7] ...................................... G06F 15/00
(52) U.S. Cl. ......................................... 358/1.15; 358/1.13
(58) Field of Search .................. 395/101–117; 358/505, 401, 1.15, 1.14, 411, 412, 435, 443, 442, 476

(56) References Cited

U.S. PATENT DOCUMENTS

| | | | |
|---|---|---|---|
| 5,175,632 | * 12/1992 | Hayashi et al. | 358/401 |
| 5,694,158 | * 12/1997 | Kato et al. | 347/139 |
| 5,781,310 | * 7/1998 | Nakamura et al. | 358/468 |
| 5,786,594 | * 7/1998 | Ito et al. | 250/236 |
| 5,822,553 | * 10/1998 | Gifford et al. | 395/309 |

* cited by examiner

*Primary Examiner*—Scott Rogers
*Assistant Examiner*—Douglas Tran
(74) *Attorney, Agent, or Firm*—McGinn & Gibb, PLLC

(57) ABSTRACT

A multi-function peripheral device serving as a peripheral device of an information processing device has a plurality of functions including a scanner function for retrieving an image from a document. The multi-function peripheral device uses multitask processing to execute at least a first task, which uses the scanner function, simultaneously with at least a second task. The multi-function peripheral device includes: a simultaneous operation determination unit that determines whether the first task using the scanner function is being performed simultaneously with the second task; and a retrieval speed control unit that reduces retrieval speed of the scanner function when the simultaneous operation determination unit determines that the first task using the scanner function is being performed simultaneously with the second task.

11 Claims, 3 Drawing Sheets

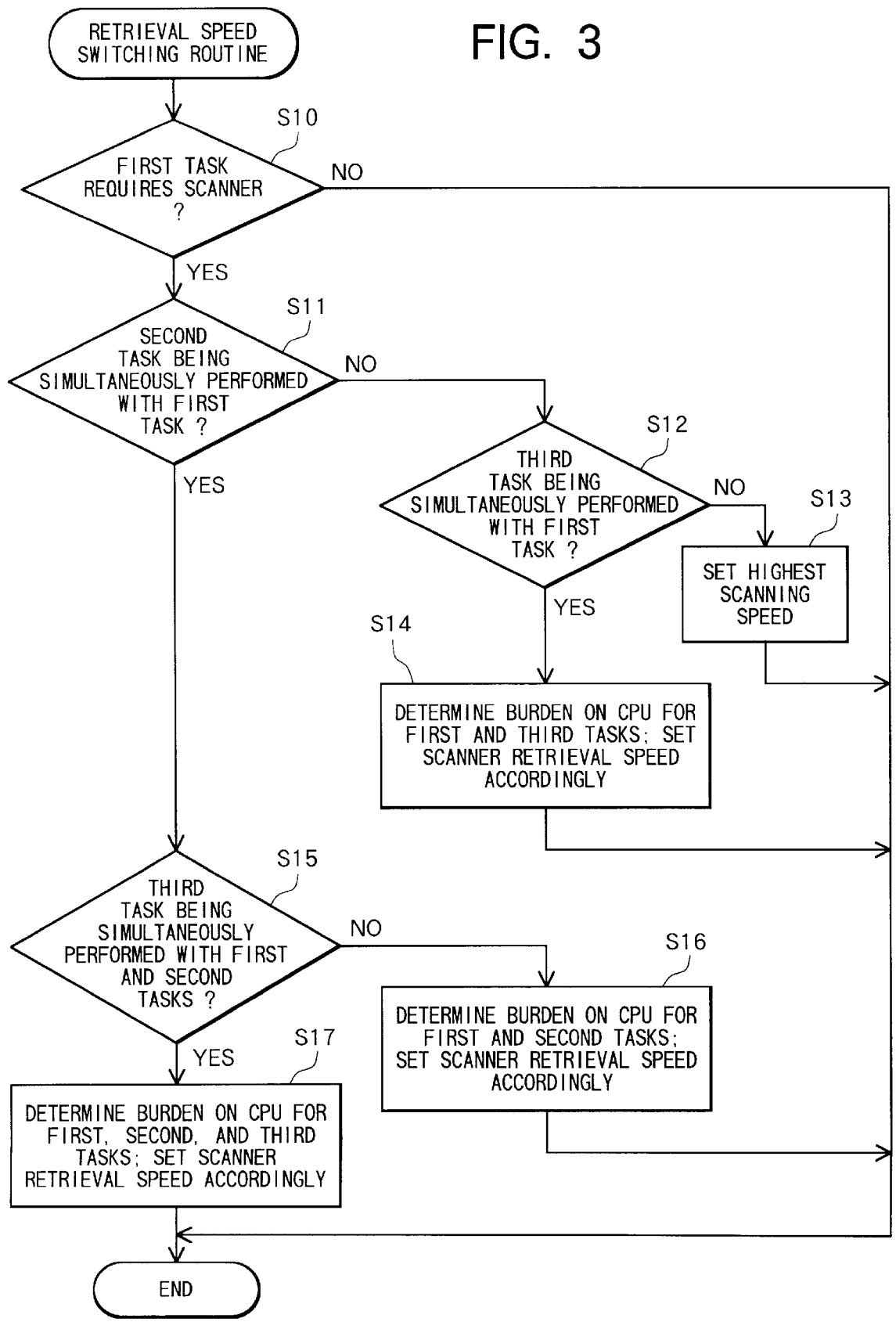

MULTI-FUNCTION PERIPHERAL DEVICE

BACKGROUND OF THE INVENTION

1. Field of the Invention

The present invention relates to a multi-function peripheral device serving as a peripheral device of an information processing device and including a plurality of functions such as a scanner function, the multi-function peripheral device being capable of simultaneously executing the plurality of functions using multi-task processing. The present invention further relates to a recording medium storing a program for operating this multi-function peripheral device.

2. Description of the Related Art

Recently, development of multi-function peripheral devices has been proceeding at a startling rate. Such multi-function peripheral devices can serve as a peripheral device of an information processing device such as a personal computer. The multi-function peripheral devices include a plurality of functions such as a scanner function. The multi-function peripheral devices are capable of simultaneously executing the plurality of functions by using multi-task processing.

For example, a multi-function peripheral device can include: a scanner function for retrieving an image of a document and producing image data accordingly; a printer function for printing an image on a desired recording sheet based on image data; and a facsimile modem function for modulating image data and then transmitting the image data over a transmission line, such as a telephone line, or demodulating image data inputted over the transmission line. In this case, the multi-function peripheral device serves as a scanner device, a printer device, and a facsimile modem of an information processing device. Additionally, the multi-function peripheral device can be used as a copy machine by using the scanner function and the printer function. Also, the multi-function peripheral device can be used as a facsimile device by using the scanner function, the printer function, and the facsimile modem function to realize a facsimile function.

Further, by performing multi-task processing, all of these different functions can be performed simultaneously as required. For example, a plurality of functions can be simultaneously operated by sequentially and cyclically devoting time of the control unit to perform the different tasks using the functions.

SUMMARY OF THE INVENTION

When a task using the scanner function is performed in conventional multi-function peripheral devices, images are retrieved at a fixed speed regardless of whether other tasks are being simultaneously performed with the task using the scanner function. Because the same CPU is used to perform all tasks, the CPU's capacity to perform individual tasks is lowered during simultaneous operations. As a result, the retrieval performance of the scanner function is reduced during simultaneous operation.

That is to say, because the CPU simultaneously performs different tasks using time sharing processes, the ability of the CPU to perform each task is reduced compared to when different tasks are not being simultaneously performed. Because the document is transported past the image sensors of the scanner at the same retrieval speed whether tasks are simultaneously performed or not, the CPU will be unable to process the resultant image data fast enough to keep up with the retrieval speed of the image sensor during simultaneous operation. As a result, the retrieval operation of the image sensors must be frequently stopped and started. When the retrieval operation of the image sensors is intermittently or non-uniform, the charge accumulation period for the light receiving elements of the image sensor will not be uniform throughout the retrieval process. Also, the document feed mechanism will operate intermittently so that smooth operations can not be maintained. Because of these problems, the image signal from the image sensor will not correctly correspond to the document image.

It is an objective of the present invention to overcome the above-described problems and to provide a multi-function peripheral device capable of maintaining performance of the scanner function during simultaneous operation even when the CPU's capacity to process individual tasks is reduced when a plurality of tasks are simultaneously performed. It is another objective of the present invention to provide a storage medium storing programs for operating such a multi-function peripheral device.

In order to achieve the above-described objectives, a multi-function peripheral device according to the present invention serves as a peripheral device of an information processing device and having a plurality of functions including a scanner function for retrieving an image from a document, the multi-function peripheral device using multitask processing to execute at least a first task, which uses the scanner function, simultaneously with at least a second task, the multi-function peripheral device including: a simultaneous operation determination unit that determines whether one task using the scanner function is being performed simultaneously with the second task; and a retrieval speed control unit that reduces retrieval speed of the scanner function when the simultaneous operation determination unit determines that the first task using the scanner function is being performed simultaneously with the second task.

With this configuration, when any task using the scanner function is being operated simultaneously with any other task, that is, whether the other task uses the scanner function or not, the speed at which the scanner function retrieves a document is reduced, thereby preventing the processing capacity of the CPU from falling behind the speed at which the scanner function retrieves the document. This prevents document retrieval operations from being frequently stopped. As a result, even when a plurality of tasks are simultaneously operated so that the ability of the CPU to process each task drops, the scanner function will not be degraded.

Because the processing ability of the CPU during simultaneous operation will be able to keep up with the retrieval speed of the image sensors configuring the scanner, the image sensors will smoothly retrieve images without frequent stops in operation. Accordingly, the light receiving elements of the image sensor will have a uniform charge accumulation period throughout the image retrieval process. Also, operation of the document feed mechanism will be cyclic and smooth. As a result, the image signal from the image sensor will accurately correspond to the document image.

Examples of image processing devices usable with the multi-function peripheral device of the present invention include a computer such as a personal computer, a work station, or other computers.

The plurality of functions including the scanner function can also include a printer function, a personal computer facsimile function, a copy function, and a facsimile function, although these are only possible examples. The personal computer facsimile function enables the multi-function peripheral device to modulate image data from an information processing device and transmit the modulated image data over a transmission line, such as a telephone line. The personal computer facsimile function also enables the multi-function peripheral device to demodulate image data inputted over the transmission line and to supply the demodulated image data to the information processing device.

Tasks using the scanner function include a variety of tasks that use the scanner as a resource, such as: a scanner task using the scanner function; a copy task using the copy function; and a facsimile task using the facsimile transmission function.

The simultaneous operation determination unit and the retrieval speed control unit can be realized by operating the CPU based on a predetermined program.

According to another aspect of the present invention, the speed at which the scanner function retrieves the document is changed by changing the cycle of the clock signal for outputting charges from each of the light receiving elements of the image sensor configuring the scanner function. Although other methods can also be used, with this configuration, the speed at which the documents are retrieved can be easily changed.

As an alternative method of changing the retrieval speed, the speed at which the documents are retrieved can be changed by changing the speed at which documents are fed. However, with such a method, it is necessary to change the rotational speed of the document feed motor or change the reduction ratio of the drive transmission mechanism of the document feed mechanism. As a result, control operations and mechanisms related to performing these operations will become more complicated. On the other hand, the cycle of the clock signal can be easily changed by, for example, using logic circuitry to switch the frequency division ratio of an oscillator that outputs a clock signal. For example, by changing the frequency division ratio of the oscillator from ⅙ to ⅛, then the clock signal outputted from the oscillator can be switched from one pulse for every six pulses inputted (3.33 Mhz for 20 Mhz) to one pulse for every eight pulses inputted (2.5 Mhz for 20 Mhz).

On the other hand, by changing both the clock signal cycle and the feed speed of documents, the retrieved image data will have the same high resolution, regardless of the retrieval speed.

Metal oxide semiconductor (MOS) image sensors or charge couple device (CCD) image sensors can be used as the image sensors. However, these are just examples.

According to another aspect of the present invention, a storage medium stores a program for operating the multi-function peripheral device capable of executing simultaneous operation of a plurality of functions using multi-task processing. The multi-function peripheral device includes a plurality of functions such as a scanner function and serves as a peripheral device of an information processing device. The storage medium stores a simultaneous operation determination program for determining whether or not a task is being simultaneously operated with a task using the scanner function. The storage medium also includes a retrieval speed control program for reducing the speed at which the scanner function retrieves a document when it is determined in the simultaneous operation determination program that another task is being operated simultaneously with the task using the scanner function.

With this configuration, a multi-function peripheral device described in the above paragraphs can be operated by operating the CPU of the multi-function peripheral device based on the program stored in the storage medium.

Examples of storage medium to which this aspect of the present invention can be applied include a ROM, an EPROM, an EEPROM, and a flash memory. However, these are only examples. The storage medium could also be a floppy disk or a CD-ROM.

BRIEF DESCRIPTION OF THE DRAWINGS

The above and other objects, features and advantages of the invention will become more apparent from reading the following description of the preferred embodiment taken in connection with the accompanying drawings in which:

FIG. 3 is a flowchart representing a modification of the retrieval speed switching routine shown in FIG. 2.

DETAILED DESCRIPTION OF THE PREFERRED EMBODIMENTS

Figure 1:
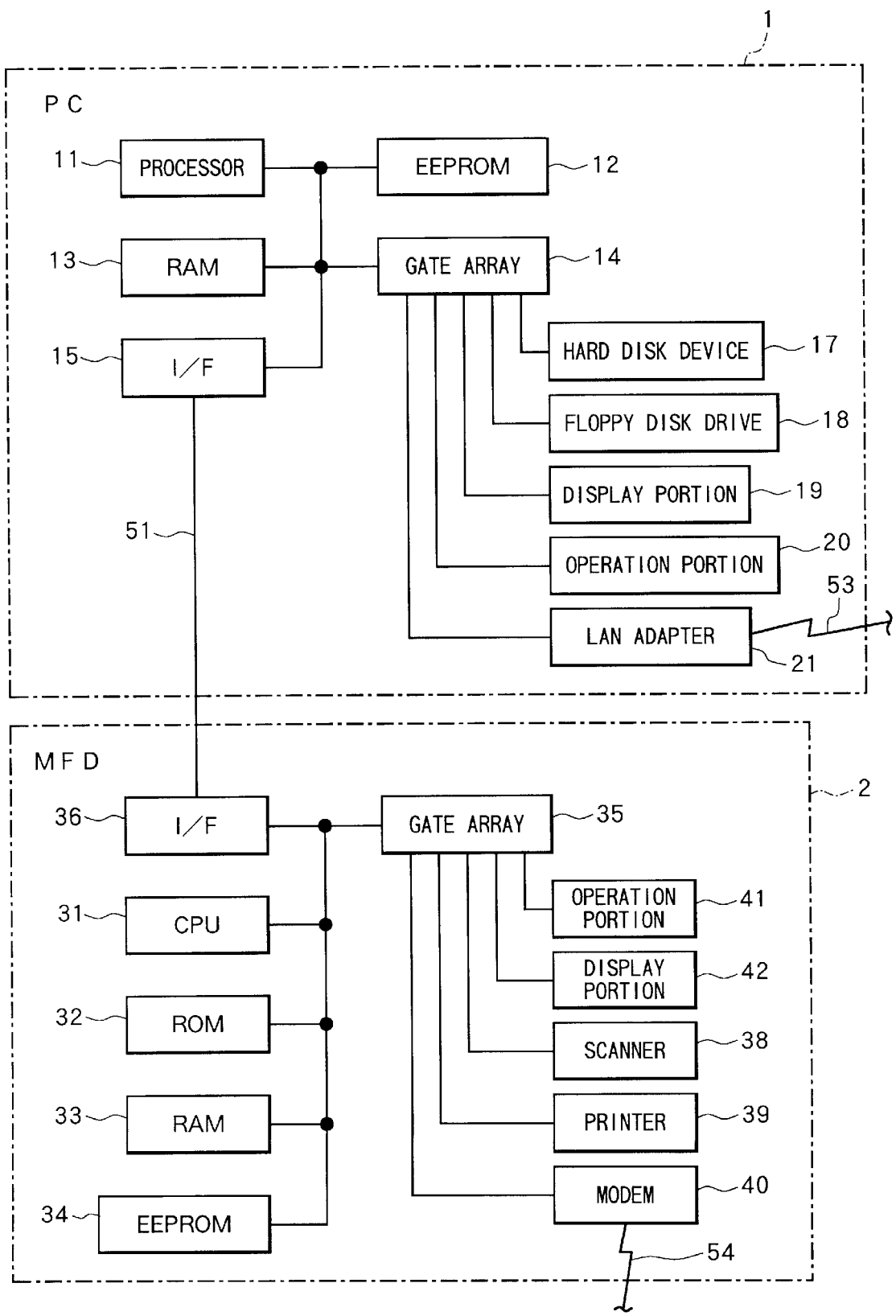
FIG. 1 is a block diagram showing configuration of a multi-function peripheral device according to a first embodiment and an information processing device connected to the multi-function peripheral device.

A multi-function peripheral device according to a preferred embodiment of the present invention will be described while referring to the accompanying drawings wherein like parts and components are designated by the same reference numerals to avoid duplicating description.

FIG. 1 is a block diagram showing circuitry of a multi-function peripheral device 2 and a personal computer 1 when the multi-function peripheral device 2 is connected to the personal computer 1. The personal computer 1 uses a graphical user interface (GUI) including multi-windows. The personal computer 1 is capable of simultaneously executing a variety of application software. The multi-function peripheral device is capable of performing a plurality of functions such as a facsimile function, a printer function, an image scanner function, and a copy function.

First, an explanation will be provided for the personal computer 1. The personal computer 1 includes: a processor 11, an EEPROM 12, a RAM 13, a gate array 14, an interface 15, a hard disk device 17, a floppy disk drive 18, a display portion 19, an operation portion 20, and a local area network (LAN) adapter 21. The processor 11, the EEPROM 12, the RAM 13, the gate array 14, and the interface 15 are connected together by a bus line. The bus line can be a data bus, an address bus, and a control signal line, or any combination of these. The hard disk device 17, the floppy disk drive 18, the display portion 19, the display portion 19, operation portion 20, and the LAN adapter 21 are connected to the gate array 14. A local area network (LAN) 53 is connected to the LAN adapter 21 of the personal computer 1.

The processor 11 operates to perform information processing based on programs such as a variety of application software and operation systems installed in the hard disk device 17. The EEPROM 12 stores a variety of registration data and the like. The RAM 13 stores a variety of data used by a variety of application software and the like. The gate array 14 functions as an interface between the processor 11 and other components including the hard disk device 17, the floppy disk drive 18, the display portion 19, the operation portion 20, and the LAN adapter 21. The interface 15 controls transmission and reception of data between the personal computer 1 and the multi-function peripheral device 2 based on a particular standard such as Centronics. The hard disk device 17 stores a variety of application software programs. The floppy disk drive 18 retrieves information from a floppy disk or writes information on the floppy disk. The display portion 19 can be a liquid crystal display and is controlled by the processor 11 to display figures, characters, and the like. The operation portion 20 can be a keyboard or a mouse for outputting operation signals based on operations of the user. The LAN adapter 21 functions as an interface between the personal computer 1 and the LAN 53.

Now, a description will be provided for configuration of the multi-function peripheral device 2. The multi-function peripheral device 2 includes a CPU 31, a ROM 32, a RAM 33, an EEPROM 34, a gate array 35, an interface 36, a scanner 38, a printer 39, a modem 40, an operation portion 41, and a display portion 42. The CPU 31, the ROM 32, the RAM 33, the EEPROM 34, the gate array 35, and the interface 36 are connected together by a bus line. The bus line can be a data bus, an address bus, a control signal line, or a combination of these. The gate array 35 is connected with the scanner 38, the printer 39, the modem 40, the operation portion 41, and the display portion 42. The interface 36 is connected to the interface 15 of the personal computer 1 via a cable 51. The modem 40 of the multi-function peripheral device 2 is connected to a telephone circuit 54.

The CPU 31 performs overall control of the multi-function peripheral device 2. The ROM 32 stores programs for controlling the multi-function peripheral device 2. The RAM 33 stores a variety of data. The EEPROM 34 stores a variety of flags and registration data. The gate array 35 functions as an interface between the CPU 31 and other components including the scanner 38, the printer 39, the modem 40, the operation portion 41, and the display portion 42. The interface 36 controls transmission and reception of data between the personal computer 1 and the multi-function peripheral device 2 based on a standard such as Centronics. The scanner 38 retrieves an image from a document and converts the image into an image signal. The printer 39 prints an image based on image data or other data. To transmit and receive facsimile messages, the modem 40 modulates a carrier wave according to transmission data and demodulates received carrier waves to obtain the received data. The operation portion 41 includes a plurality of key switches and outputs operation signals according to key switches operated by the user. The display portion 42 includes a liquid crystal display and is controlled by the CPU 31 to perform a variety of display operations.

The hard disk device 17 of the personal computer 1 is installed with multi-function device (MFD) control application software for performing a variety of functions in the mult-ifunction peripheral device 2. For example, the hard disk device 17 is installed with software for: using the modem 40 of the multi-function peripheral device 2 to enable facsimile transmission between the personal computer 1 and a remote facsimile machine; using the printer 39 to print text and images prepared in the personal computer 1; and using the scanner 38 to retrieve images and input the resultant image signals into the personal computer 1. The MFD control application software is installed in the hard disk device 17 by inserting a floppy disk including the MFD control application software into the floppy disk drive 18 and performing predetermined operations to copy the MFD control application software onto the hard disk device 17.

The MFD control application software includes: fax driver software for performing data conversion such as converting text data into bit map data; log manager software for logging and displaying a transmission record; and status monitor software for overseeing transmission and reception of data between the personal computer 1 and the personal computer 1.

Next, an explanation will be provided for essential operations of the multi-function peripheral device 2 having the above-described configuration. The multi-function peripheral device 2 is capable of performing a plurality of functions, such as the printer function, the image scanner function, the personal computer facsimile function, a copy function, and a facsimile function, and uses time sharing processes to simultaneously perform the plurality of functions without generating contradictions between different operations. The printer function operates the printer 39 to print data inputted from the personal computer 1 and into the interface 36 via the cable 51. The scanner function operates the scanner 38 to retrieve an image from a document and output the retrieved image data to the personal computer 1. The personal computer facsimile function operates the modem 40 to modulate facsimile transmission data from the personal computer 1 and transmit the modulated facsimile transmission data over the telephone circuit 54. The personal computer facsimile function also operates the modem 40 to demodulate facsimile reception data inputted over the telephone circuit 54 and supply the demodulated data to the personal computer 1. The copy function operates the printer 39 to print data retrieved from a document by the scanner 38. The facsimile function operates the modem 40 to modulate image data retrieved by the scanner 38 and transmits the modulated image data as facsimile transmission data over the telephone circuit 54. The facsimile function also operates the modem 40 to demodulate facsimile reception data inputted from the telephone circuit 54 and prints out the demodulated facsimile reception data using the printer 37.

As mentioned above, the multi-function peripheral device 2 is capable of simultaneously operating a variety of these functions at the same time without generating conflict between the different functions. For example, while the printer is being operated, it is possible to use the personal computer facsimile function and the scanner function at the same time because neither of these functions uses the printer 39. In this case, multiplex operation is used to transmit packets of print data from the personal computer 1 to the multi-function peripheral device 2, packets of scanner data from the multi-function peripheral device 2 to the personal computer 1, and packets of facsimile data between the personal computer 1 and the multi-function peripheral device 2 both ways over the cable 51, which serves as a carrier channel. Also, the CPU 31 of the multi-function peripheral device 2 simultaneously executes print tasks, scanner tasks, and facsimile tasks using multi-task processing. Even if both the printer function and the copy function are simultaneously operated, although both of these functions require the printer 39, the copy function can still be used to retrieve the image of documents by using the scanner 38 while the printer 39 is being used for performing the printer function. In this manner, the printer task and the copy task can be simultaneously performed. In this case, the image data retrieved by the scanner 38 is stored in the RAM 33 until the printer 39 frees up, whereupon the printer 39 can be used to print the image data for the copy task.

It should be noted that the scanner task, the copy task, and the facsimile task all use the scanner 38. When one of these tasks is simultaneously performed with another task, which may or may not require the scanner 38, the CPU 31 of the multi-function peripheral device 2 controls the scanner 38 to retrieve images at the slower speed than when only one task is being performed. Said differently, the retrieval speed of the scanner 38 is controlled to be slower during simultaneous operation than during non-simultaneous operation. In the present embodiment, the retrieval speed is reduced by increasing the period between consecutive pulses of the clock signal for outputting charge from each light receiving element of the image sensor which configures the scanner 38.

As a result, even if a task which uses the scanner 38 is performed simultaneously with another task, the CPU 31 can process data retrieved by the scanner 38 at a speed sufficient to keep up with the retrieval speed of the scanner 38. As a result, there is no need to frequently stop the retrieval operations of the scanner 38. As a result, the retrieval performance of the scanner 38 will be maintained at a good level.

Figure 2:
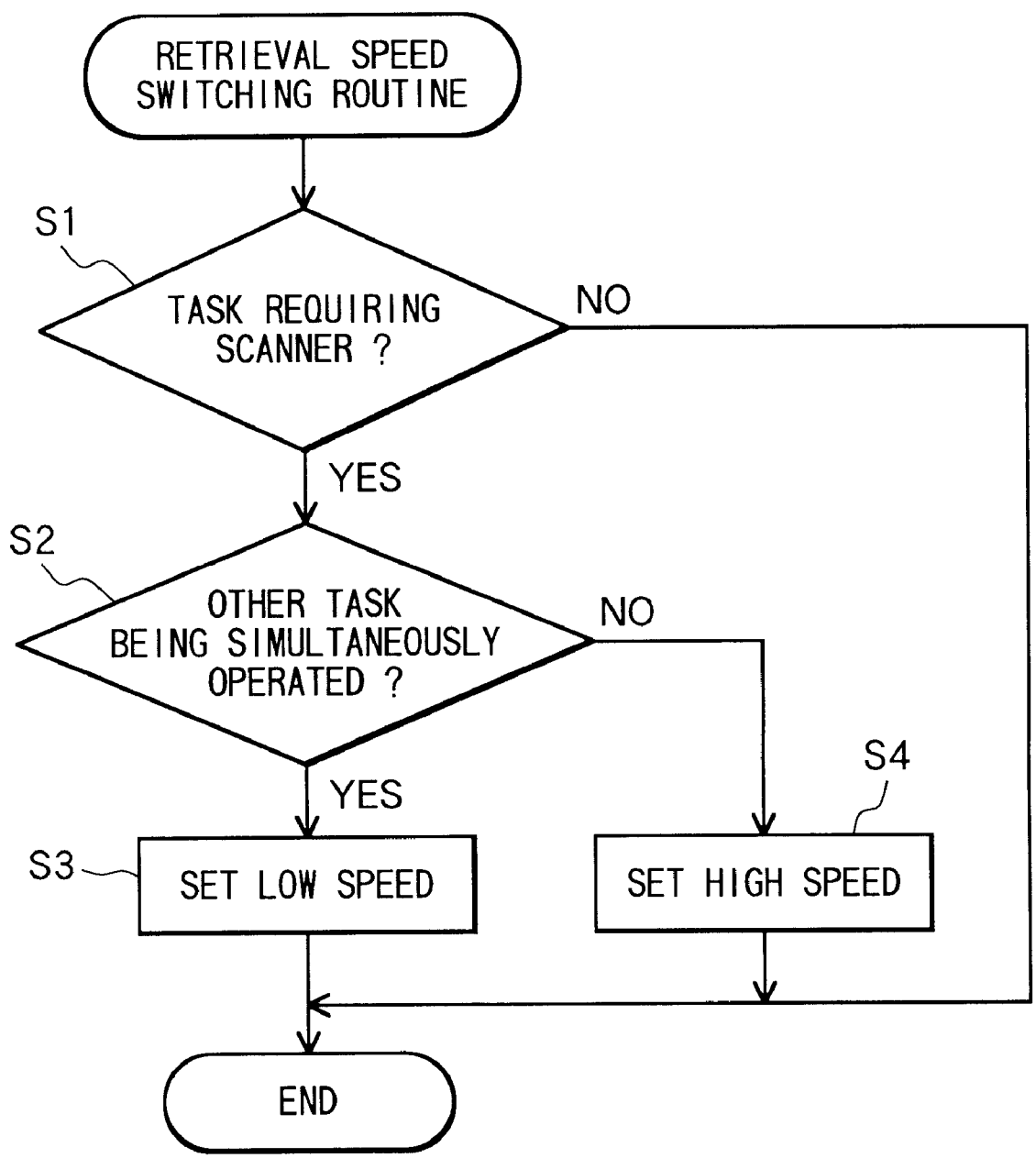
FIG. 2 is a flowchart representing a retrieval speed switching routine performed in the multi-function peripheral device of FIG. 1.

Next, an explanation for operations performed by the CPU 31 of the multi-function peripheral device 2 for switching the retrieval speed of the scanner 38 will be provided while referring to the flowchart shown in FIG. 2.

First, each time the CPU 31 is required to perform a task, such as when the CPU 31 is required to start performing a new task or, as a result multi-task processes, the CPU 31 is switched from performing one task to another, the CPU 31 determines in S1 whether or not the task to be executed uses the scanner 38. For example, the CPU 31 determines whether or not the task to be executed is a scanner task, a copy task, or a facsimile task. It should be noted that when a copy task is being performed but an image of a document has already been retrieved and its image data already stored in the RAM 33, the CPU 31 will not determine that the copy task is a task using the scanner 38. Also, the CPU 31 determines that the facsimile task does not use the scanner 38 during reception of an incoming facsimile message because this operation does not require the scanner 38.

When the CPU 31 determines that the task to be executed requires the scanner 38 (S1:YES), then in S2, the CPU 31 determines whether or not another task is simultaneously being operated.

If another task is simultaneously being operated (S2:YES), then in S3, the CPU 31 reduces the retrieval speed of the scanner 38 to a low speed. That is to say, when another routine is simultaneously being operated, then the CPU 31 has a lower processing capability compared to if each task were being performed individually. Therefore, the CPU 31 reduces the retrieval speed of the scanner 38 to match its own processing capability during simultaneous operation. In this embodiment, the CPU 31 lowers the retrieval rate of the scanner 38 by increasing the period between consecutive pulses of the clock signal for outputting charges from each light receiving element of the image sensor configuring the scanner 38. On the other hand, when the CPU 31 determines that no other tasks are being simultaneously operated (S2:NO), then in S4 the CPU 31 sets the retrieval speed of the scanner 38 to a higher speed than during simultaneous operation. That is to say, when simultaneous operations are not being performed, the CPU 31 has sufficient processing capability to keep up with the higher retrieval speed of the scanner 38 so there is no need to lower the retrieval speed of the scanner 38.

If in S1, the CPU 31 determines that the task to be executed does not require the scanner 38 (S1:NO), then there is no need to switch the retrieval speed of the scanner 38 so this routine is ended.

While the invention has been described in detail with reference to specific embodiments thereof, it would be apparent to those skilled in the art that various changes and modifications may be made therein without departing from the spirit of the invention, the scope of which is defined by the attached claims.

For example, in the present invention, the above-described retrieval speed switching routine shown in FIG. 2 is executed to set the retrieval speed of the scanner 28 each time the task is switched by a timer interrupt routine. However, the retrieval speed of the scanner 38 can be switched by executing the retrieval speed switching routine periodically each time task switching is performed a predetermined number of times.

Also, the embodiment describes the retrieval speed of the scanner being slowed by increasing the period between consecutive pulses of the clock signal for outputting charges of the image sensors in the scanner. However, the retrieval speed can be lowered by reducing the relative movement between the document and image sensors, that is, either by reducing the feed speed of the document or the scanning speed of the scanner, depending on the type of scanning system is being used. Also, the period between consecutive pulse signals can be increased while also slowing the relative movement between the image sensors and the document.

Further, in the above-described embodiment, explanation was provided for the situation where two tasks were performed simultaneously. However, the present invention can be applied to a situation wherein three or more tasks are simultaneously operated. In this case, the retrieval speed of the scanner 38 can be reduced depending on the number of tasks simultaneously performed by taking into account the cumulative processing burden placed on the CPU 31 by the tasks.

Here an example of operations when three or more tasks are simultaneously operated will be described while referring to the flowchart in FIG. 3. In this example, it will be assumed that the retrieval speed switching routine is performed whenever operation of the CPU 31 is switched between tasks. To facilitate explanation, the task newly subject to operations of the CPU 31 will be referred to as the first task.

First in S10, whether or not the first task requires the scanner is determined. If not (S10:NO), then there is no need to change the retrieval speed of the scanner so this routine is ended.

On the other hand, if the first task requires the scanner (S10:YES), then in S11 it is determined whether or not a second task, different from the first task, is being simultaneously performed with the first task. If not (S11:NO) then in S12, it is determined whether or not a third task, different from the first and second tasks, is being performed simultaneously with the first task. If so (S12:YES), then in S14 the cumulative burden placed on CPU 31 by performing the first and third tasks is determined and the retrieval speed of the scanner is set accordingly. Afterward, the routine is ended. On the other hand if the third task is not being performed simultaneously with the first task (S12:NO), then in S13 the scanner retrieval speed is set to the highest speed because no other tasks are being performed with the first task. This routine is ended after completion of S13.

If the second task is being simultaneously performed with the first task (S11:YES), then in S15 it is determined whether or not the third task is being simultaneously performed with the first and second tasks. If not (S15:NO), then in S16 the cumulative burden placed the CPU for the first and second tasks is determined and the retrieval speed of the scanner is set accordingly. Then this routine is ended.

If the third task is being simultaneously performed with the first and second tasks (S15:YES), then in S17 the cumulative burden placed on the CPU by performing the first, second, and third tasks simultaneously is determined and the retrieval speed is set accordingly. This ends the routine.

It should be noted that the retrieval speed set in S17 will be slower than the retrieval speeds set in either S14 or S16 because more tasks are being performed. However, whether or not the retrieval speed set in S14 is higher than that set in S16 depends on how much of a burden the second and third tasks place on the CPU 31.

What is claimed is:

1. A multi-function peripheral device serving as a peripheral device of an information processing device and having a plurality of functions including a scanner function for retrieving an image from a document, the multi-function peripheral device using multitask processing to execute at least a first task, which uses the scanner function, simultaneously with at least a second task, the multi-function peripheral device comprising:
    a simultaneous operation determination unit that determines, repeatedly at one of timing of switching tasks and at an integral multiple of the timing of switching tasks, whether the first task using the scanner function is being performed simultaneously with the second task; and
    a retrieval speed control unit that reduces retrieval speed of the scanner function when the simultaneous operation determination unit determines that the first task using the scanner function is being performed simultaneously with the second task and that does not reduce said retrieval speed of the scanner function when the simultaneous operation determination unit determines that the first task using the scanner function is not being performed simultaneously with the second task.

2. A multi-function peripheral device as claimed in claim 1, wherein the retrieval speed control unit reduces retrieval speed by increasing a period between consecutive pulses of a clock signal for outputting charges from light receiving elements of an image sensor for performing the scanner function.

3. A multi-function peripheral device as claimed in claim 2, further comprising a document feed mechanism that transports the document past the image sensor, the retrieval speed control unit reducing feed speed of the document feed mechanism in accordance with the retrieval speed of the scanner function.

4. A multi-function peripheral device as claimed in claim 1, wherein:
    the simultaneous operation determination unit determines whether the first task using the scanner function is being performed simultaneously with both the second task and also with a third task; and
    the retrieval speed control unit reduces retrieval speed of the scanner function to a slower speed when the simultaneous operation determination unit determines that the first task using the scanner function is being performed simultaneously with both the second task and the third task than when the simultaneous operation determination unit determines that the first task using the scanner function is being performed simultaneously with only the second task.

5. A multi-function peripheral device as claimed in claim 4, further comprising a control unit for performing the first task, the second task, and the third task, the retrieval speed control unit reducing retrieval speed of the scanner function depending on cumulative burden placed on the control unit by the first task and a simultaneously performed one of the second task and the third task.

6. A multi-function peripheral device as claimed in claim 1, further comprising a scanner unit for performing the first task using the scanner function, the scanner unit capable of retrieving an image from a document at a plurality of retrieval speeds, the retrieval speed control unit reducing retrieval speed of the scanner function by changing retrieval speed of the scanner unit.

7. A medium storing programs for controlling a multi-function peripheral device serving as a peripheral device of an information processing device and having a plurality of functions including a scanner function for retrieving an image from a document, the multi-function peripheral device using multitask processing to execute at least a first task, which uses the scanner function, simultaneously with at least a second task, the medium storing:
    a simultaneous operation determination program that determines repeatedly at one of timing of switching tasks and at an integral multiple of the timing of switching tasks, whether the first task using the scanner function is being performed simultaneously with the second task; and
    a retrieval speed control program that reduces retrieval speed of the scanner function when the simultaneous operation determination program determines that the first task using the scanner function is being performed simultaneously with the second task and that does not reduce said retrieval speed of the scanner function when the simultaneous operation determination program determines that the first task using the scanner function is not being performed simultaneously with the second task.

8. A multi-function peripheral device having a plurality of functions including a scanner function for retrieving an image from a document, the multi-function peripheral comprising:
    a determination unit that determines repeatedly at one of timing of switching tasks and at an integral multiple of the timing of switching tasks, whether one task, which uses the scanner function, is being performed simultaneously using multitask processing with another task; and
    a control unit that controls retrieval speed of the scanner function based on determination of the determination unit, wherein the control unit controls retrieval speed of the scanner function to a slowest retrieval speed when the determination unit determines that the one task is being performed simultaneously with the other task and controls said retrieval speed of the scanner function to a highest retrieval speed when the determination unit determines that the one task is not being performed simultaneously with the other task.

9. A multi-function peripheral device having a plurality of functions including a scanner function for retrieving an image from a document, the multi-function peripheral comprising:
    a processing unit that performs processes for the plurality of functions;
    a determination unit that determines, repeatedly at one of timing of switching tasks and at an integral multiple of the timing of switching tasks, whether the processing unit is operating under a condition that reduces capacity of the processing unit to process; and a switching unit that automatically switches retrieval speed of the scanner function based on the determination of the determination unit, wherein the condition determined by the determination unit is whether one task, which uses the scanner function, is being performed simultaneously using multitask processing with another task, and the switching unit switches said retrieval speed of the scanner function to a slow retrieval speed when the determination unit determines that the one task is being performed simultaneously with the other task and controls retrieval speed of the scanner function to a high retrieval speed when the determination unit determines that the one task is not being performed simultaneously with the other task.

10. A multi-function peripheral device as claimed in claim 1, further comprising a control unit that performs the first and second tasks, wherein when the simultaneous operation determination unit determines that the first task is being performed simultaneously with the second task, the retrieval speed control unit reduces retrieval speed of the scanner function according to a cumulative burden placed on the control unit by the control unit performing the first and second tasks simultaneously.

11. A multi-function peripheral device serving as a peripheral device of an information processing device and having a plurality of functions including a scanner function for retrieving an image from a document, the multi-function peripheral device using multitask processing to execute at least a specific task, which uses the scanner function, simultaneously with at least one other task, the multi-function peripheral device comprising:

a control unit that performs the specific task and the at least one other task;

a simultaneous operation determination unit that determines, repeatedly at one of timing of switching tasks and at an integral multiple of the timing of switching tasks, whether the specific task using the scanner function is being performed simultaneously with the at least one other; and a retrieval speed control unit that reduces retrieval speed of the scanner function according to a cumulative burden placed on the control unit by the control unit performing the specific task and the at least one other task simultaneously when the simultaneous operation determination unit determines that the specific task is being performed simultaneously with the at least one other task.

* * * * *